(12) United States Patent
Forck et al.

(10) Patent No.: US 8,830,926 B2
(45) Date of Patent: Sep. 9, 2014

(54) METHOD FOR NETWORK CO-ORDINATION IN A MOBILE COMMUNICATIONS SYSTEM AND APPARATUS THEREOF

(75) Inventors: Andreas Forck, Berlin (DE); Thomas Haustein, Potsdam (DE); Volker Jungnickel, Berlin (DE); Malte Schellmann, Munich (DE); Egon Schulz, München (DE); Lars Thiele, Berlin (DE); Thomas Wirth, Berlin (DE); Wolfgang Zirwas, München (DE)

(73) Assignees: Nokia Siemens Networks Oy, Espoo (FI); Fraunhofer Gesellschaft zúr Förderung der Angewandten Forschung e.V., Munich (DE)

( * ) Notice: Subject to any disclaimer, the term of this patent is extended or adjusted under 35 U.S.C. 154(b) by 207 days.

(21) Appl. No.: 13/124,920

(22) PCT Filed: Oct. 27, 2008

(86) PCT No.: PCT/EP2008/064554
§ 371 (c)(1),
(2), (4) Date: Aug. 26, 2011

(87) PCT Pub. No.: WO2010/048985
PCT Pub. Date: May 6, 2010

(65) Prior Publication Data
US 2011/0305195 A1   Dec. 15, 2011

(51) Int. Cl.
*H04W 4/00* (2009.01)
*H04B 7/02* (2006.01)
*H04B 7/06* (2006.01)

(52) U.S. Cl.
CPC ............. *H04B 7/022* (2013.01); *H04B 7/026* (2013.01); *H04B 7/0617* (2013.01)

USPC .......................................................... 370/329

(58) Field of Classification Search
None
See application file for complete search history.

(56) References Cited

U.S. PATENT DOCUMENTS 6,683,862 B1 * 1/2004 Kim et al. ..................... 370/342
6,952,394 B1 * 10/2005 Kim et al. ..................... 370/208

(Continued)

FOREIGN PATENT DOCUMENTS

| EP | 2 051 402 A2 | 4/2009 |
|---|---|---|
| WO | WO 2008/003022 A2 | 1/2008 |
| WO | WO 2009/057400 A2 | 5/2009 |

OTHER PUBLICATIONS

L. Thiele, M. Schellmann, S. Schiffermuller, V. Jungnickel, W. Zirwas, "Multi-Cell Channel Estimation using Virtual Pilots", IEEE Vehicular Technology Conference, May 2008, entire document.*

(Continued)

*Primary Examiner* — Suk Jin Kang
(74) *Attorney, Agent, or Firm* — Harrington & Smith (57) ABSTRACT

Method and Apparatus thereof for coordinating a joint transmission between a plurality of cooperative access nodes serving a plurality of user terminals in a mobile communications system, including the steps of: receiving channel information by said access nodes from user terminals that are being served by said access nodes; exchanging between said access nodes of said received channel information thus ensuring that all channel information is distributed to all cooperative access nodes; processing all received channel information by each one of said access nodes, and determining by said access nodes using said processed channel information, of a channel estimation for said joint transmission.

6 Claims, 9 Drawing Sheets

Distributed joint transmission scheme.

(56) References Cited

U.S. PATENT DOCUMENTS

| | | | |
|---|---|---|---|
| 2004/0156454 A1* | 8/2004 | Kim | 375/340 |
| 2007/0036066 A1* | 2/2007 | Thomas et al. | 370/208 |
| 2007/0248172 A1 | 10/2007 | Mehta et al. | 375/260 |
| 2007/0270157 A1* | 11/2007 | Kim et al. | 455/456.1 |
| 2008/0003948 A1* | 1/2008 | Mitran | 455/67.11 |
| 2008/0101489 A1* | 5/2008 | Wang et al. | 375/260 |
| 2008/0219371 A1* | 9/2008 | Hong et al. | 375/260 |
| 2009/0117911 A1* | 5/2009 | Molisch et al. | 455/450 |
| 2009/0286482 A1* | 11/2009 | Gorokhov et al. | 455/63.1 |
| 2009/0286562 A1* | 11/2009 | Gorokhov | 455/501 |
| 2010/0027471 A1* | 2/2010 | Palanki et al. | 370/328 |
| 2010/0035600 A1* | 2/2010 | Hou et al. | 455/422.1 |
| 2010/0067604 A1* | 3/2010 | Bhadra et al. | 375/267 |
| 2010/0074183 A1* | 3/2010 | Chen et al. | 370/328 |
| 2010/0085917 A1* | 4/2010 | Gorokhov et al. | 370/328 |
| 2010/0103834 A1* | 4/2010 | Gorokhov et al. | 370/252 |
| 2010/0105404 A1* | 4/2010 | Palanki et al. | 455/450 |
| 2010/0157901 A1* | 6/2010 | Sanderovitz et al. | 370/328 |
| 2010/0315989 A1* | 12/2010 | Reznik et al. | 370/315 |
| 2011/0122789 A1* | 5/2011 | Haustein et al. | 370/252 |
| 2011/0263271 A1* | 10/2011 | Hoymann et al. | 455/456.1 |
| 2012/0120838 A1* | 5/2012 | Farajidana et al. | 370/252 |

OTHER PUBLICATIONS

Huawei: 3GPP TSG RAN WG1#54, "Consideration on CoMP for LTE-Advanced", R1-083049, Jeju, Korea, Aug. 18-22, 2008 (3 pages).

Karakayali, M.K., et al., "Network Coordination for Spectrally Efficient Communications in Cellular Systems", IEEE Wireless Communications, Aug. 2006, pp. 56-61.

Ng, B.L., et al., "Transmit Beamforming with Cooperative Base Stations", ISIT, Sep. 4-9, 2005, 5 pgs.

3GPP TS 36.300 V8.0.0 (Mar. 2007), $3^{rd}$ Generation Partnership Project; Technical Specification Group Radio Access Network; Evolved Universal Terrestrial Radio Access (E-UTRAN) and Evolved Universal Terrestrial Radio Access Network (E-UTRAN); Overall description; Stage 2 (Release 8), 82 pgs.

Jungnickel V et al: "Implementation concepts for distributed cooperative transmission," Signals, Systems and Computers, 2008 42nd Asilomar Conference on, IEEE, Piscataway, NJ, USA, Oct. 26, 2008, pp. 1035-1039, XP031475445,ISBN: 978-1-4244-2941.

* cited by examiner

Fig. 1: Prior art: Centralized joint transmission scheme.

Fig. 2 Architecture of the 3G LTE system.

PRIOR ART

Fig. 3: Distributed joint transmission scheme.

Fig. 4: Left: Synchronization results using GPS reference clocks. With an free LOS to the sky, averaging may be performed to synchroize also the reference frequencies. Right: The IEEE 1588 protocol is intended for timing synchronization over the Ethernet Fig. 5: Two proposals for MAC synchronization. Left: Multicast on S1, Right: Unicast on S1 plus multicast on X2.

Fig. 6 Realization based on multicast on S1 and control exchange on X2.

Fig. 7 Realization based on unicast on S1 plus multicast on X2.

Fig. 8 Cell ID planning using virtual pilots

Fig. 9 System level evaluation results using virtual pilots

Fig. 10 Mirror feedback (left). Fusion of CSI at the serving base station (right).

Fig. 11 The best user grouping minimizes the SINRs at the terminals.

Fig. 12 Summary of cooperative MIMO protocol

METHOD FOR NETWORK CO-ORDINATION IN A MOBILE COMMUNICATIONS SYSTEM AND APPARATUS THEREOF

CROSS-REFERENCE TO RELATED APPLICATIONS

This is a 35 U.S.C. §371 application of PCT/EP 2008/064554, filed on Oct. 27, 2008.

FIELD OF THE INVENTION

The invention is used in mobile communications systems to ensure that the networks operating therein are coordinated and that cooperative transmissions can be effected.

SUMMARY OF THE INVENTION 3G ($3^{rd}$ Generation Wireless Mobile Communication Technology) mobile networks require intensive network planning in order to achieve a high capacity of UEs (User Equipments) and user satisfaction based on pre-determined traffic models, network topology data and networking scenarios. In order to reduce interference caused by the high number of UEs present, cooperative transmission is used. By cooperative transmission it is meant that multiple base stations (BSs) serve jointly a set of user terminals (UEs) scheduled onto the same radio resource in their respective cells, within a mobile communications system. Using cooperative beam-forming at the base stations, interference among the cells can be reduced. For this purpose, the base stations exchange data signals as well as channel state information stemming from feedback of the terminals. Such an implementation is provided by M. K. Karakayali, G. J. Foschini, and R. Valenzuela, "Network Co-ordination for spectrally efficient communications in cellular systems," IEEE Wireless Communications, vol. 13, no. 4, 2006 and in "3GPP TS 36.300v800, E-UTRA and E-UTRAN—overall description", March, 2007.

However, an efficient integration of cooperative transmission within 3GPP ($3^{rd}$ Generation Partnership Project) LTE (Long Term Evolution) is not that simple as there exist incompatibilities with the backbone structure used in LTE.

Most integration approaches are centralised, i.e. based on a remote network controller (RNC). This is however not applicable in LTE, because flat IP (internet protocol)-based network architecture is used without an RNC. Rather, there is a local network controller (LNC) in each base station (BS), and all LNCs have to self-organize over the IP-based backbone network in order to realize the joint transmission.

Figure 1:
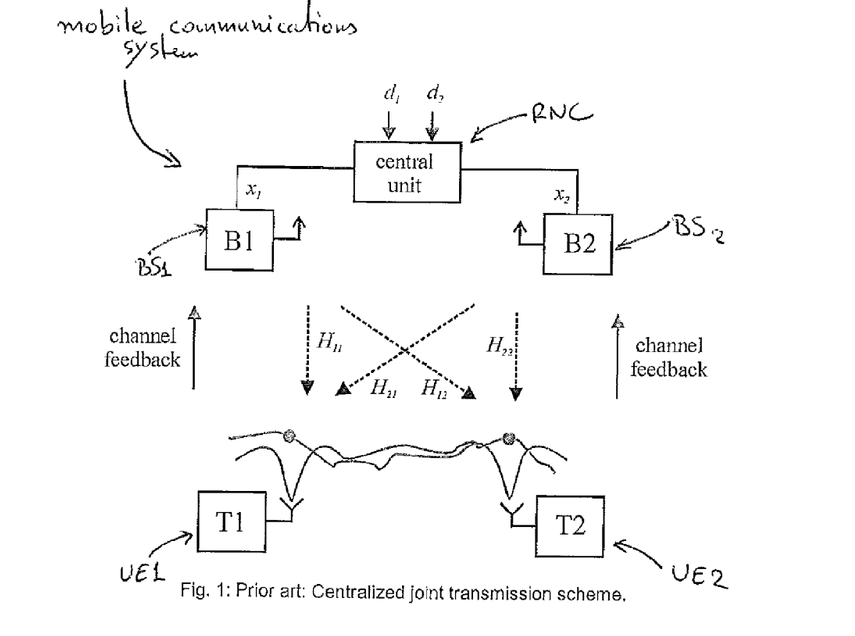
FIG. 1 depicts an exemplary current state of the art system using a centralised joint transmission.

According to current state of the art, joint transmission is performed at a central station where all data and all channel state information from all base stations (BSs) and all user terminals (UEs) is available. Data are jointly pre-processed so that each user terminal (UE) gets its own signal while the interference from signals intended for other users is minimized. Such a state of the art system is depicted in FIG. 1. Such centralized processing is compatible to the backbone architecture of legacy mobile communication systems in which a remote network controller (RNC) is present, e.g. GSM (Global System for Communications), UMTS (Universal Mobile Telecommunications System). Novel systems, like HSDPA (High Speed Downlink Packet Access) or LTE do not have a RNC where the joint processing could be realised.

Figure 2:
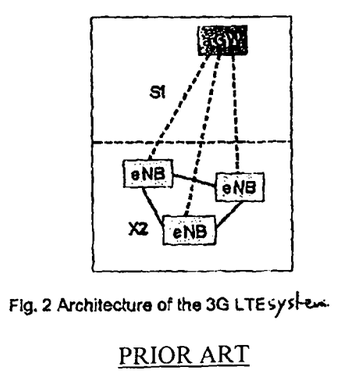
FIG. 2 depicts a backbone network architecture used in 3GPP LTE.

FIG. 2 depicts a backbone network architecture used in 3GPP LTE. There are two networks between the base stations. Data are delivered from the Internet over an advanced gateway (aGW) to which the base stations (denoted as enhanced nodeBs, eNBs) are connected in a star network using the so-called S1 interface. In addition, eNBs coordinate their transmission over the so called X2 interface. The network establishes an additional meshed network between the eNBs. Both networks can be based on the same infrastructure, i.e. star and meshed networks are just logically separated. A first advantage of this new backbone network architecture is that essential decisions, like the scheduling of radio resources, can be performed closer to the radio channel, i.e. at each base station separately. In this way, channel state information is not so much outdated anymore. Radio transmission can be adapted instantaneously to the time-varying wireless channel, with the goal that even the fast frequency-selective fading can be tracked. Multipath, multiuser and spatial diversity can be realized in this way leading to a significantly improved network performance. More specifically, radio resources can be assigned in which the instantaneous signal-to-interference-and-noise ratio is maximized, and hence the interference between the eNBs is minimized.

A need therefore exists for a technique which resolves the integration of joint transmission in such a manner that it can be seamlessly integrated, allowing for a reduced signaling overhead and maintaining a high system performance.

With the present invention, the above mentioned issues are resolved. The technique is achieved by the teachings contained in the independent claims. Preferred embodiments of the invention are described in the dependent claims.

Said independent method coordinates a joint transmission between a plurality of cooperative access nodes serving a plurality of user terminals in a mobile communications system, comprising the steps of:
  receiving channel information by said access nodes from user terminals that are being served by said access nodes;
  exchanging between said access nodes of said received channel information thus ensuring that all channel information is distributed to all cooperative access nodes;
  processing all received channel information by each one of said access nodes, and
  determining by said access nodes using said processed channel information, of a channel estimation for said joint transmission.

Said independent access node is arranged for coordinating a joint transmission having means adapted to execute the method steps described previously.

Further refinements and advantages can be seen in the dependent claims.

SHORT DESCRIPTION OF THE DRAWINGS

The present invention will become more apparent from the description given herein below and from the accompanying drawings which are given by way of illustration only, and thus are not limitative of the present invention, and wherein:

FIG. 5 (left) depicts a MAC synchronization using multicast over the S1 interface.

FIG. 5 (right) depicts a MAC synchronization using unicast over the S1 interface and multicast over the X2 interface.

DETAILED DESCRIPTION OF THE INVENTION

Figure 3:
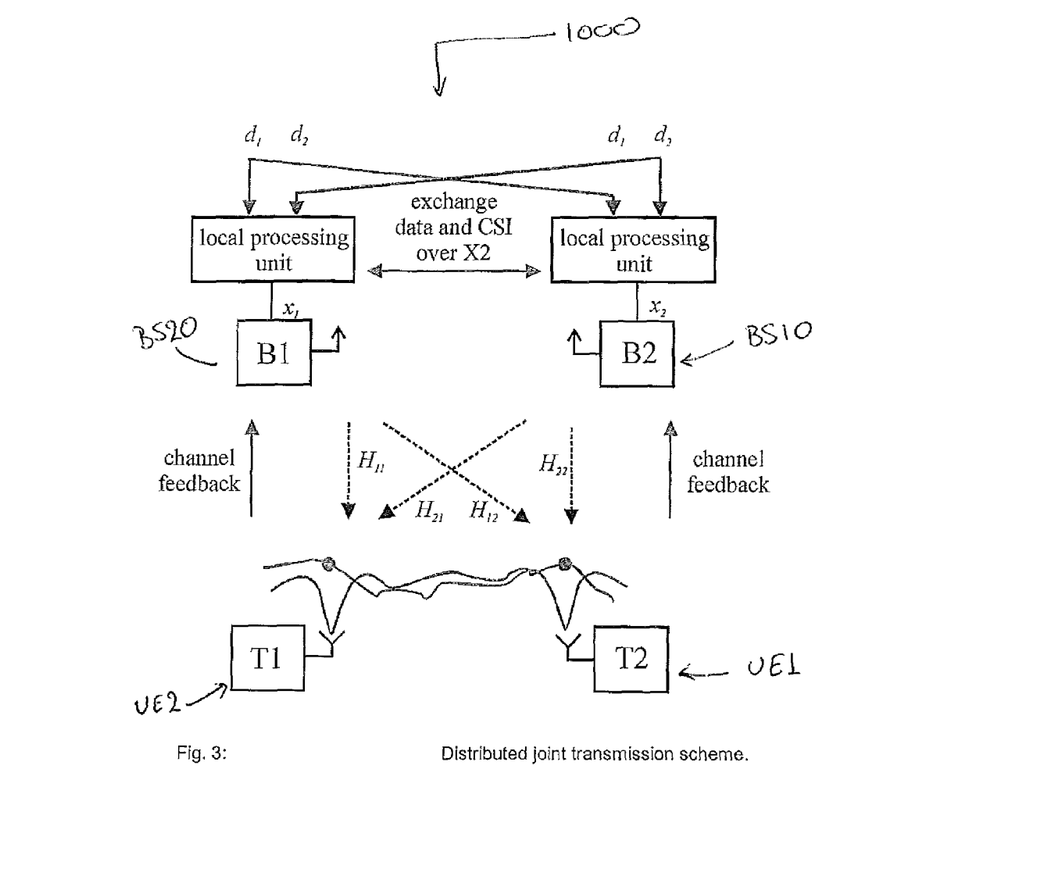
FIG. 3 depicts the basic principle of the invention.

The basic principle of the invention is shown in FIG. 3. Rather than using a central unit as in FIG. 1, data are distributed to all cooperative base stations (BSs). Moreover, the superimposed pilots of all base stations (BSs) are received by each user terminal (UE), and the compound channel information from all base stations (BSs) is fed back to the serving base station (BS). Observations are exchanged between the base stations (BS) over the X2 interface, such that the compound multiuser multicell channel matrix can be recovered at each base station (BS) involved in the cooperative transmission. At each base station, there is a local processing unit which computes the locally relevant beam forming weights and applies them to the data streams intended for the user terminals (UEs).

In order however, to make such distributed cooperative transmission efficient and well integrated within the mobile communications system, further points have also to be clarified. These points regard:

The synchronization of physical and MAC (medium access control) layer.

The CQI (channel quality identifier)-based user terminal grouping.

The pilot design suitable for multicell channel estimation.

The efficient feedback transmission.

The recovery of channel state information from the feedback.

The cooperative beam-forming of antenna beams.

The equalization and rate enhancement based on secondary pilots.

PHY Synchronization

For cooperative transmission, we need much better synchronization than in current cellular networks. At first, the base stations shall act coherently, like in a single-frequency network. Hence, radio frontends and the frame structure must be synchronized among the base stations. A general requirement is that the synchonisation should be significantly better than the cyclic prefix duration of the OFDM (Orthogonal Frequency Division Multiplexing) transmission, which is 4.7 µs in LTE. Otherwise, asynchronous transmission of cooperative base stations would result in inter-symbol interference.

Figure 4:
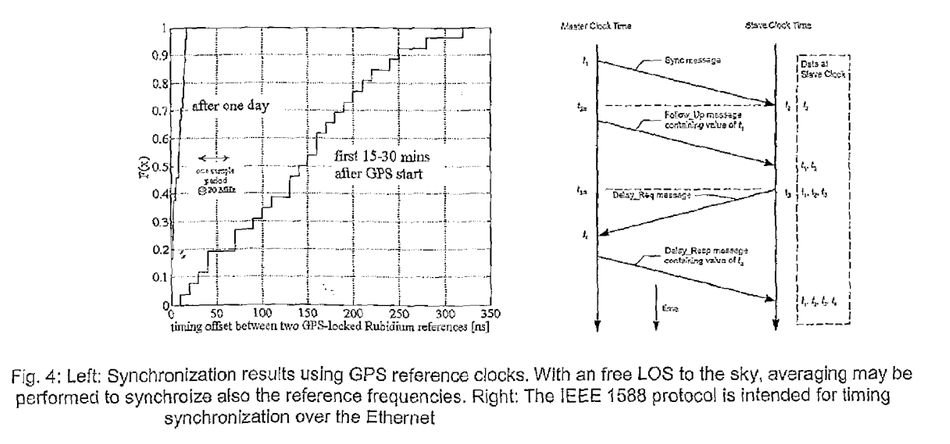
FIG. 4 depicts synchronization results using a GPS and an Ethernet reference.

Synchronization can be either realized using the global positioning system (GPS) or over the network. While GPS synchronization is applicable only to outdoor base stations deployed above rooftops, network synchronization as discussed in the IEEE standard 1588 may be used to embed indoor base stations into the network having no line-of-sight to the sky. GPS-locked Rubidium reference clocks achieve frequency accuracy below $2 \cdot 10^{-12}$. Measurements using two commercial GPS-locked Rubidium clocks are shown in FIG. 4, left. The frame start can be synchronized with a median jitter of 10 ns using the common one-pulse-per-second output signal.

In FIG. 4, right, a master clock sends a synchronization message followed by a time stamp containing the value of the master clock. The slave answers with a delay request signal which is received and then responded by the master. From the local times at the slave when the synch and response messages are received and the received time stamp, the slave can compute the timing offset and correct the local clock accordingly. Typical accuracy of synchronization over standard Ethernet is 100 ns with updates every 2 seconds using inexpensive oscillators, lightly loaded network switches and simple PI servos for averaging. 20 ns accuracy require careful design with faster sampling, better oscillators, sophisticated statistics and servo algorithms and careful control of environment especially temperature.

It should be Noted that the IEEE 1588 protocol is designed for subnets, and not for wide area coverage like the network timing protocol (NTP) which has however much lower precision. Hence GPS synchronization at the master base station on rooftop may be combined with network synchronization for nearby outdoor and indoor base stations in the same or adjacent subnets.

MAC Synchronization

The synchronous physical layer transmission of two cooperative base stations serving different terminals in different cells can be modelled as $$\begin{pmatrix} x_1 \\ x_2 \end{pmatrix} = \begin{pmatrix} W_{11} & W_{12} \\ W_{21} & W_{22} \end{pmatrix} \begin{pmatrix} d_1 \\ d_2 \end{pmatrix}, \quad (1)$$

where $d_{1,2}$ are the data signals intended for terminals 1 and 2, $W_{ij}$ are the cooperative beam-forming weights, and $x_{1,2}$ the waveforms transmitted at both base stations. In the distributed realization of the signal processing, all data signals are needed at all base stations involved in the cooperative transmission. Weights are obtained based on the same algorithm running in each base station redundantly. Each base station creates the own transmit waveform from both data streams using the local subset of weights.

In a real-time implementation, equation (1) implies that both data streams have to arrive synchronously at both base stations. This cannot be taken for granted, considering the enormous complexity of MAC processors used in base stations nowadays.

In the MAC processor, packets are classified according to the IP packet number, user terminal address and type of service (TOS) being extracted from the header. Next, a packet is segmented into MAC PDUs (packet data units or transport blocks) and filled into the queues of corresponding user terminals (UEs), according to address and TOS fields. Retransmissions are organized in multiple parallel hybrid automatic repeat request (HARQ) processes, before each PDU is mapped adaptively onto the space-time-frequency resource grid. The modulation and coding schemes (MCS) are variable, according to the scheduling algorithm in the control plane. The algorithm takes the fading channel as well as traffic requirements into account. All these highly complex control and user plane processes finally result in those two data streams $d_{1,2}$ in Eq. (1) to be transmitted synchronously by both base stations (BSs).

As a consequence, the entire MAC layers must be tightly synchronized between cooperative base stations (BSs). MAC synchronization is important in the overall concept of cooperative base stations. There are two ways how this MAC synchronization can be achieved.

1: Multicast on S1

Figure 5:
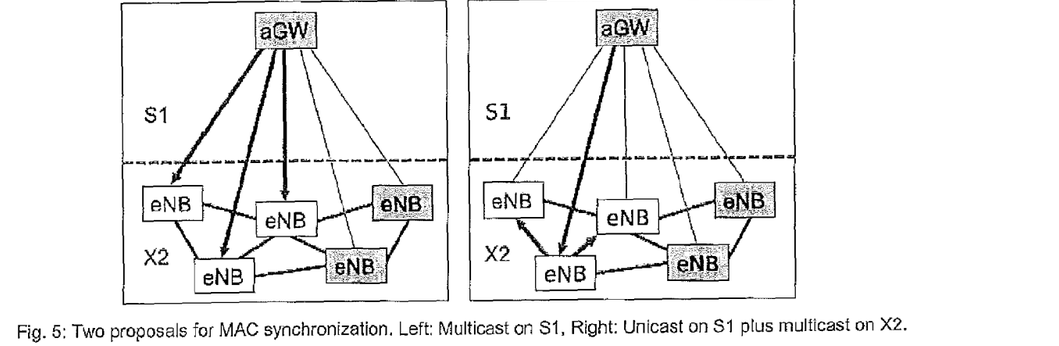

In this proposal, data of terminals in a cooperative set are multicast from aGW to involved eNBs as indicated by the arrows in FIG. 5, left. Since the data arrive asynchronously at eNBs, MAC processing must be synchronized over X2, as detailed in FIG. 6.

Figure 6:
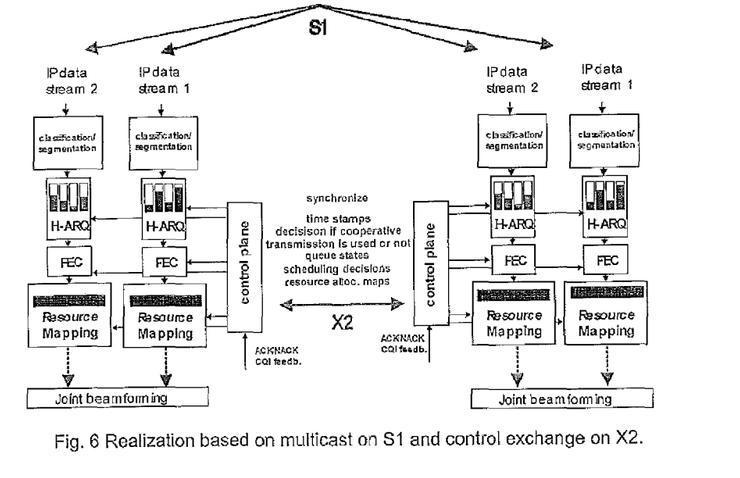
FIG. 6 depicts an implementation of a MAC synchronization using multicast over the S1 and control exchange over the X2 interface.

As a consequence of this architecture, cooperation between two base stations requires a copy of the MAC processor of the master eNB in each cooperating eNB all acting as slaves. The control planes of cooperative MACs have to exchange control information to synchronize their data flows. Already at the segmentation stage, time stamps are added based on the local GPS-disciplined clock in the serving eNB. Each IP packet is classified and segmented into one or more PDUs. Time stamps include packet and PDU numbers as well as mapping and MCS information and the time to sent (TtS). Based on these stamps, the entire data flow is organized as usual in the master eNB. Only the stamps but no data are sent to cooperating base stations. The slave eNB receives the same data packets via S1 with more or less delay. According to packet numbers and terminal address, the TtS and mapping information are extracted from the corresponding stamp list sent by the master.

Segmentation and mapping are performed redundantly as in the master eNB. The only difference concerns the HARQ where timely exchange of control information is critical. As a way out, retransmissions may be realized on exclusive resources only by the master eNB so that interference is avoided. Data transport on X2 is avoided but S1 is charged with multicast.

2: Unicast on S1 Plus Multicast on X2

Figure 7:
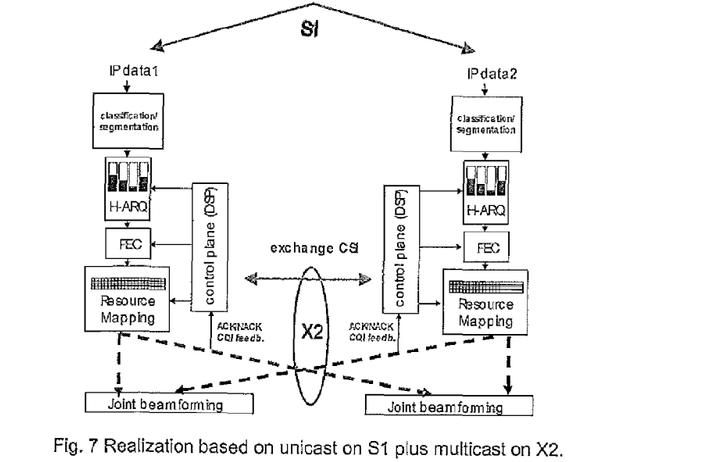
FIG. 7 depicts an implementation of a MAC synchronization using unicast over the S1 interface and multicast over the X2 interface.

In this proposal (depicted in FIG. 7), the data of terminals are unicast to the serving eNB, where the unique instance of the MAC processor is situated. Exchange of control information is limited to the negotiation between eNBs if cooperation is used or not. After passing the data through the entire MAC processor, mapping information is created when and where to send data in the cooperative mode. The mapping information is forwarded together with ready-to-sent PDUs to the slave eNBs via X2. Implementation of this approach is simpler. Retransmissions are possible also in the cooperative mode. There is less data load on S1, but even more on X2.

Latency of data is limited in general by the latency of control information on X2 in the cooperative mode. Existing latency requirements for data (<5 ms in LTE) can be met if X2 is physically realized over dedicated links.

X2 can be narrowband for proposal 1, but there is a lot of protocol exchange needed to organize the synchronization of MAC PDUs. On the other hand, the narrowband X2 allows a simple extension to cooperative relaying.

Implementation is simpler for proposal 2, if there is a broadband connection available for X2. Broadband X2 links can be realized by microwave, optical fiber or free-space optics.

Coherent Channel Feedback

Cooperative beam-forming requires the estimation of large numbers of channel coefficients from the serving and interfering base stations to each terminal.

Virtual Pilot Concept

Figure 8:
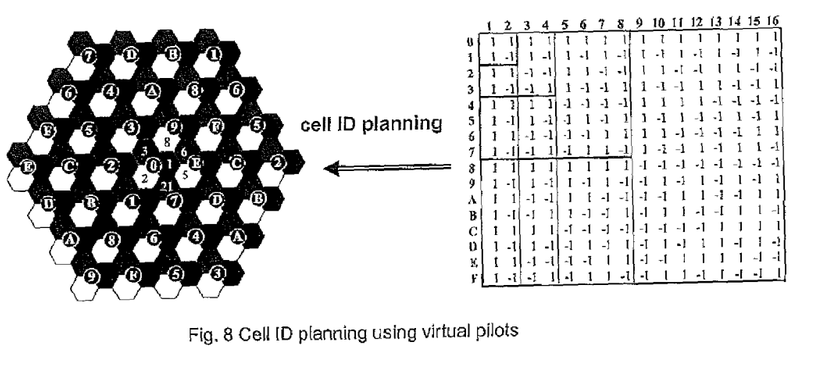
FIG. 8 depicts the virtual pilot concept.

The virtual pilot concept shown in FIG. 8 greatly reduces the pilot overhead at the cost of reduced mobility. Sector pilots are assumed to be orthogonal. Each base station is identified by an orthogonal sequence. Common pilots are scrambled by this sequence over time. In 3GPP LTE, one would use all pilots in a slot and multiply them with a given chip from the sequence. Pilots in the next slot are multiplied with the next chip, and so on.

There is a particular sequence assignment to base stations, as depicted in FIG. 8 right-hand side. The idea is based on partial cross-correlation. For some sequences families with length L, e.g. Hadamard or DFT, there are certain subsets of sequences which are mutually orthogonal already for correlation lengths being an integer fraction of L. In general, we identify closer base stations by sequences being orthogonal already in a shorter correlation window while more distant base stations use sequences which need a longer window. Consider the hexadecimal sequence numbers at the sequence list (FIG. 8, right-hand side) and their assignment in the cellular grid (FIG. 8, left-hand side). For example with correlation length 2, the next horizontal row of cells is orthogonal to the row where reference cell (using sequence 0) is situated. With length 4, in addition, the next rows oriented in ±60° direction are orthogonal as well. On average, the longer the correlation window, the more distant potential interferers are situated.

Figure 9:
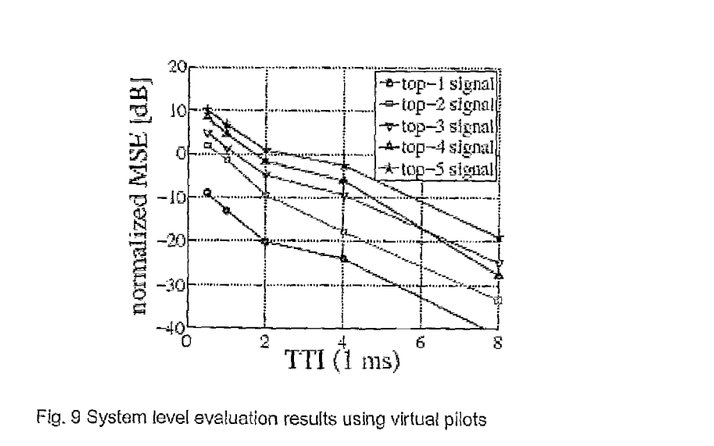
FIG. 9 depicts system level evaluation results of channel estimation based on virtual pilots.

System level evaluation results of channel estimation based on virtual pilots are shown in FIG. 9. The mean square error of the two strongest signals is below −20 dB with a correlation length of 8, which corresponds to 4 ms in 3GPP LTE, see [10]. In this time, the channel shall be almost static. The five strongest channels are estimated with the same accuracy using correlation length 16, i.e. 8 ms.

Mirror Feedback

Figure 10:
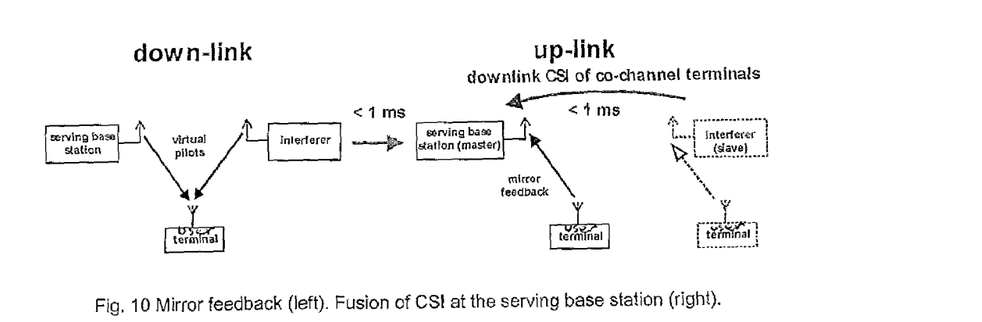
FIG. 10 depicts an illustration of mirror feedback.

A user terminal (UE) receives a superposition of the virtual pilot signals from multiple base stations (BSs), weighted by their respective channels. Instead of estimating all channels at the user terminal (UE), it is more practical to feed the received pilot signals regularly back to the base station (BS), as if one would use a mirror (FIG. 10). Received pilots are simply quantized and packed into uplink PDUs.

The channels are estimated at the base station (BS) based on the pilot sequences received at the user terminals (UE) and mirrored back to the base station (BS). Instead of multicasting the mirror feedback on air to all base stations (BSs) involved in the cooperation, it may be more reliable to transmit the mirror feedback signals only to the master station (the serving base station) via a scheduled uplink channel. Either the feedback signals or the extracted channel information is then distributed to the slave base stations via X2, see FIG. 10. Mirror feedback is given only on resource blocks actually assigned to the terminal in the downlink. This becomes possible after user grouping based on CQI, which is explained below. In this way, the feedback rate for the CSI can be lowered.

User Terminal Grouping

Figure 11:
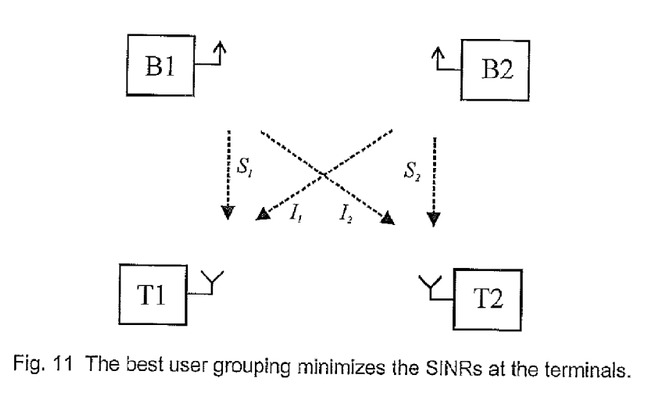
FIG. 11 depicts an illustration of user terminal grouping.

In order to group user terminals, frequency-selective multiuser MIMO scheduling is done independently in each cell, based on channel quality identifier (CQI) feedback prior to cooperative beam-forming instead of having CSI feedback over the entire bandwidth, as depicted in FIG. 11. Selected user terminals experience the minimum mutual interference, i.e. they are already grouped as orthogonal as possible.

After independent multiuser terminal scheduling in each cell, cooperative transmission is used to cancel the residual interference.

Cooperative Beam-Forming

After having synchronized data flows, obtained channel knowledge and grouped user terminals the cooperative beam-forming weights at each base station (BS) can be determined separately for each base station (BS). The locally known signal and interference channels are fused with external channel information obtained over the X2 interface. All channel coefficients are plugged into the following compound matrix $$G = \begin{pmatrix} H_{T\_1,BS\_1} & \cdots & \cdots & \cdots & H_{T\_1,BS\_N,} \\ \vdots & \vdots & \vdots & \vdots & \vdots \\ \vdots & \vdots & \vdots & \vdots & \vdots \\ H_{T\_K,BS\_1} & \cdots & \cdots & \cdots & H_{T\_K,BS\_N,} \end{pmatrix} \quad (2)$$

G is composed of the individual channel matrices $H_{k,1}$ for the user terminals k=T_1 . . . T_K selected by the independent scheduling in the cells l=BS_1 . . . BS_N. Based on the matrix G, the locally transmitted signal is formed as a scalar product $$x_{BS\_n}^{(i)} = (W_{BS\_n,1}^{(i)} \cdots W_{BS\_n,K}^{(i)}) \cdot (d_1 \cdots d_K)^T \quad (3)$$

where $d_1 \ldots d_K$ denote the data signals intended for the user terminals (UEs), $W_{BS\_n,k}^{(i)}$ are cooperative beam-forming weights being relevant at the n-th base station (BS). The signal $x_{BS\_n}$ is transmitted at the i-th antenna port. The target is to maximize the SINE at the terminal served by the master eNB and to minimize the interference to terminals served by slave eNBs.

Secondary Pilots

The cooperative beam-forming weights depend on the channels of other user terminals (UEs) in other cells, which are known only at the base stations (BSs). User terminals (UEs) cannot compute in general the optimal receive filter after beam-forming and the corresponding CQI without additional information about those channels. A second set of pilots identifying the user terminal data streams is therefore used. It is passed through the cooperative beam-forming similar to the data signals. Based on these secondary pilots, the optimal receive filter weights can be matched to the cooperative beam-forming and the wireless channel. Moreover, a new CQI can be computed and fed back to the base station (BS). This new CQI already contains the gains due to cooperative transmission. Based on this information, the rate can be updated by the link adaptation.

Summary of the Cooperative Transmission Protocol

Figure 12:
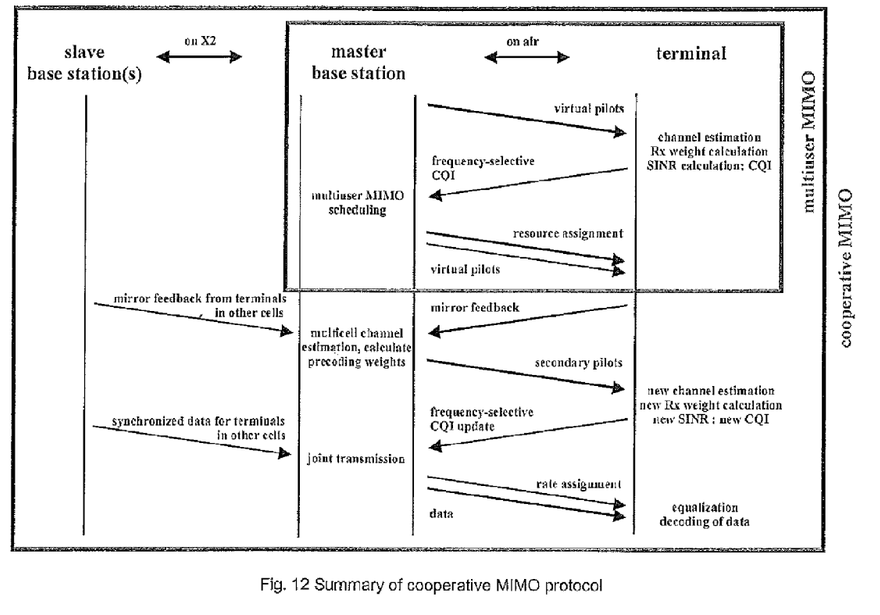
FIG. 12 depicts an illustrative overview of the interaction of the different devices, within a mobile communications system, that implement the inventive technique

FIG. 12 depicts an illustrative overview of the interaction of the different devices, within a mobile communications system, that implement the inventive technique. Regularly, the master (serving) base station (BS) transmits virtual pilots, from which the user terminal estimates the channel, calculates Rx receiver weights as well as the corresponding CQI for each resource block. Next the frequency-selective CQI is fed back to the base station, and the conventional multiuser terminal MIMO (Multiple Input Multiple Output) scheduling is performed at the master base station. The resource assignment is communicated to the user terminal via the downlink control channel. Except of the rate assignment, this part of the protocol is identical to the multiuser MIMO protocol being a prerequisite also for cooperative MIMO. It enables an independent user terminal grouping which takes place simultaneously and independently in each cell.

In the second phase, the received virtual pilots are mirrored back to the master (serving) base station but only for those resource blocks actually assigned to the user terminal for the cooperative transmission. The master base station receives over the X2 interface also the mirrored pilots from slave base stations fed back by user terminals served there. The master station performs the multicell multiuser channel estimation and determines the locally relevant precoding weights. Through the cooperative beam forming weights, all cooperative base stations transmit the secondary pilots from which the effective channel can be estimated by the user terminal. The receiver weights are updated as well as the SINR calculation. An updated frequency-selective CQI is then transmitted.

The actually used rates, on each resource, follow from the updated CQI and is now assigned to the user terminal. Finally, the data is synchronized with data from other cells and jointly transmitted by all cooperative base stations each of which uses the locally determined precoding weights.

The invention can be implemented with a combination of hardware and software means that are adapted to execute the method of the invention. The inventive technique can be executed by an access node having means adapted to execute the inventive technique. Such an access node can be at least one of the following: a base station, an access point, a base station controller, an enhanced nodeB, a nodeB, a radio network controller. The apparatus can also have means that are adapted to store a software or a computer program which when run on a processor executes the inventive technique.

Although the invention has been described in terms of preferred embodiments described herein, those skilled in the art will appreciate other embodiments and modifications which can be made without departing from the scope of the teachings of the invention. All such modifications are intended to be included within the scope of the claims appended hereto.

The invention claimed is:

1. A method for coordinating a joint transmission between a plurality of cooperative access nodes serving a plurality of user terminals in a mobile communications system, the method comprising:

regularly transmitting virtual pilot signals by said access nodes to the plurality of user terminals;

receiving channel information by said access nodes from user terminals that are being served by said access nodes, the received channel information comprising the virtual pilot signals received by said user terminals;

exchanging between said access nodes over an X2 interface said received channel information only for resource blocks that are actually assigned to at least one user terminal of the plurality of user terminals for a cooperative transmission, thus ensuring that all channel information is distributed to all cooperative access nodes;

processing all received channel information by each one of said access nodes, and determining by said access nodes using said processed channel information, a channel estimation for said joint transmission.

2. The method according to claim 1, wherein said channel information comprises channel feedback data.

3. A first access node comprising one or more processors and one or more memories including computer program code, the one or more memories and the computer program code configured, with the one or more processors, to cause the first access node to coordinate a joint transmission by performing at least:

regularly transmitting virtual pilot signals by said first access node to a plurality of user terminals;

receiving channel information by said first access node from user terminals that are being served by said first access node, the received channel information comprising the virtual pilot signals received by said user terminals;

exchanging between said first access node and a second access node over an X2 interface said received channel information only for resource blocks that are actually assigned to at least one user terminal of the plurality of user terminals for a cooperative transmission, thus ensuring that all channel information is distributed to all cooperative access nodes;

processing all received channel information by the first access node, and determining by the first access node using said processed channel information, a channel estimation for said joint transmission.

4. The first access node according to claim 3, wherein said first access node is at least one of the following: a base station, an access point, a base station controller, an enhanced nodeB, a nodeB, or a radio network controller.

5. A mobile communications system comprising the first access node according to claim 3.

6. A non-transitory computer-readable medium containing a set of instructions that causes a computer to perform a process comprising:

regularly transmitting virtual pilot signals from a plurality of access nodes to a plurality of user terminals;

receiving channel information by said plurality of access nodes from one or more user terminals of the plurality of user terminals that are being served by one or more access nodes of the plurality of access nodes, the received channel information comprising the virtual pilot signals received by said user terminals;

exchanging between said plurality of access nodes over an X2 interface said received channel information only for resource blocks that are actually assigned to at least one user terminal of the plurality of user terminals for a cooperative transmission, thus ensuring that all channel information is distributed to all cooperative access nodes;

processing all received channel information by at least one of said plurality of access nodes, and determining by at least one access node of the plurality of access nodes using said processed channel information, a channel estimation for said joint transmission.

* * * * *